No. 863,717. PATENTED AUG. 20, 1907.
F. C. JAMISON.
MEAT TENDERER.
APPLICATION FILED JUNE 16, 1906.
2 SHEETS—SHEET 1.
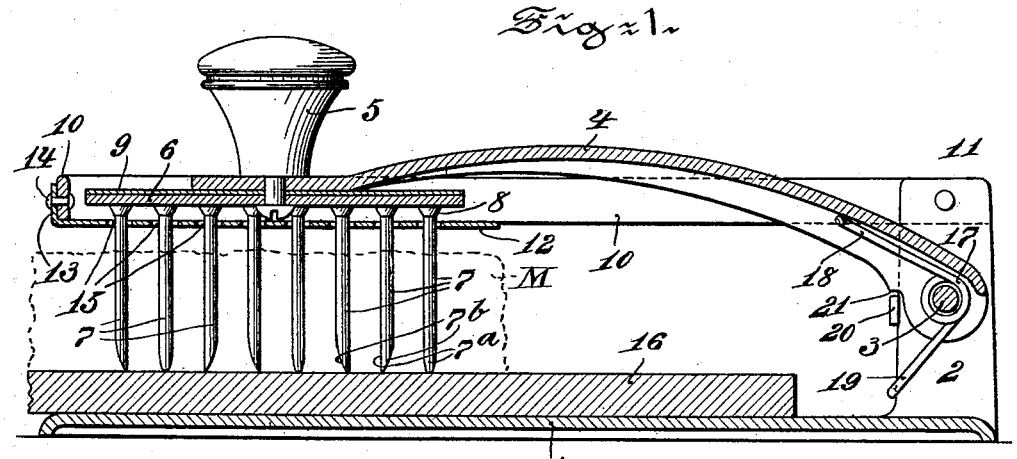
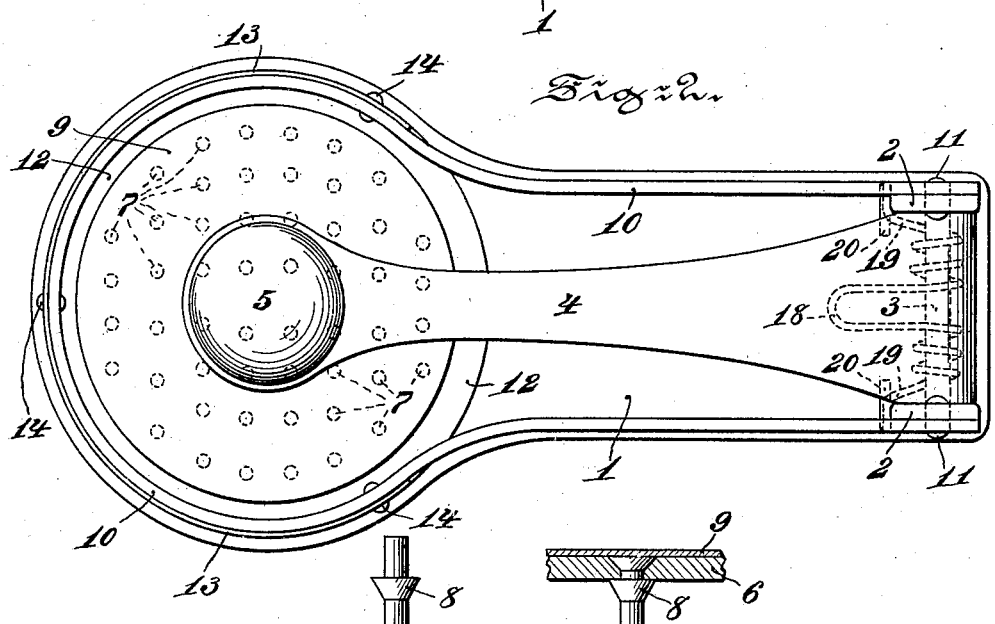
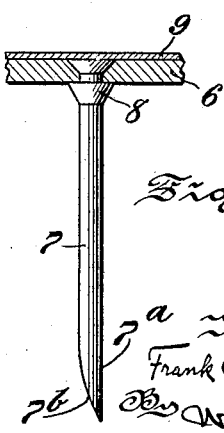
Witnesses:
Jas. C. Wolvermith
Ella M. Ware
Inventor:
Frank C. Jamison
By Walter C. Pusey
Attorneys No. 863,717. PATENTED AUG. 20, 1907.
F. C. JAMISON.
MEAT TENDERER.
APPLICATION FILED JUNE 16, 1906.

2 SHEETS—SHEET 2.

Witnesses:
Jas. C. Wobwsmith
Ella M. Ware

Inventor:
Frank C. Jamison
By Walter C. Pusey
Attorney

UNITED STATES PATENT OFFICE.

FRANK C. JAMISON, OF PHILADELPHIA, PENNSYLVANIA.

MEAT-TENDERER.

No. 863,717.   Specification of Letters Patent.   Patented Aug. 20, 1907.

Application filed June 16, 1906. Serial No. 322,000.

*To all whom it may concern:*

Be it known that I, FRANK C. JAMISON, a citizen of the United States, and residing at Philadelphia, State of Pennsylvania, have invented certain new and useful Improvements in Meat-Tenderers, of which the following is a full, clear, and exact description, reference being had to the accompanying drawings, of which—

Figure 5:
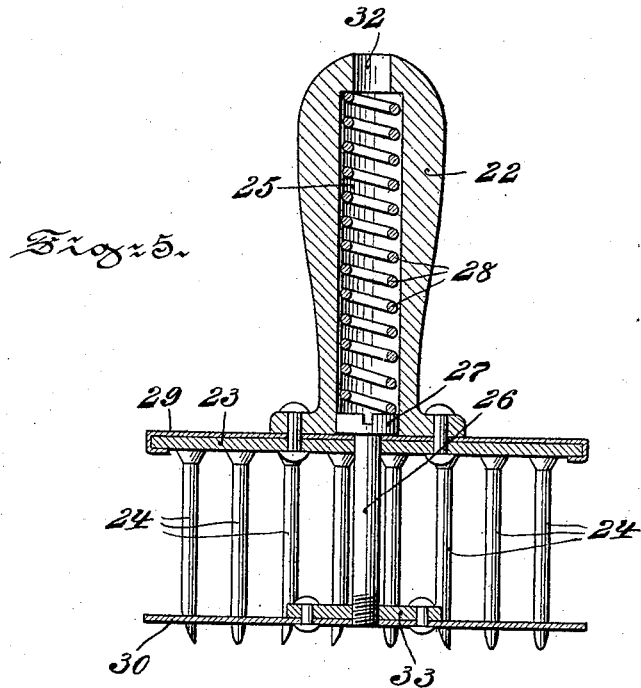
Figure 6:
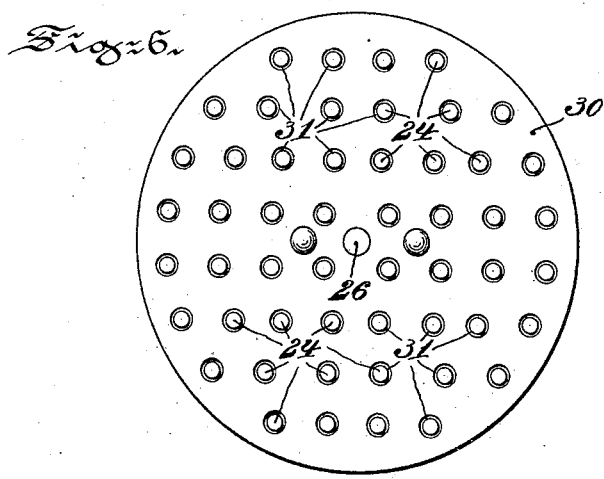

Figure 1 is a medial vertical section of one form of my invention, showing the punch-carrying arm in the depressed position. Fig. 2 is a plan view. Fig. 3 is a front view of one of the punches, detached. Fig. 4 is a side view of one of the punches, as secured to its carrying-plate, a portion of the plate being shown in section. Fig. 5 is a medial vertical section of a modified form of apparatus. Fig. 6 is a bottom plan view of the same.

The object of this invention is to provide a device for making tough meat tender.

To this end, the invention consists in providing a movable support, from which extends a number of punches of peculiar construction, in combination with a plate or disk relatively movable in respect to the punch-carrying support, and provided with holes through which said punches move.

The invention also consists in certain details of construction hereinafter described, and duly pointed out.

In the form of the device shown in Figs. 1 and 2, 1 is a cast metal base, provided with posts, 2, at one end thereof, to which is pivoted, on a shaft, 3, a forwardly extending arm, 4, which arm is provided, at its free end, with a knob or handle, 5.

To the plane, under side of the free end of the arm, 4, is secured a plate or disk, 6; secured to, and extending downwardly from which, is a series of cylindrical punches, 7. Said punches are preferably secured to said plate in the following manner:—Adjacent the upper end of each of said punches, is a flange, 8, which comes against the under surface of the plate, 6, and the upper ends of said punches respectively extend through and fit holes in said plate, and their upper ends are riveted over upon the top of said plate; or, as shown in Fig. 4, in a countersunk depression in the upper surface of the plate, 6. In order to hide the riveted heads of said punches, I would usually place, between the plate, 6, and the under surface of the free end of the arm, 4, a plate or disk, 9, of a size corresponding to that of the plate or disk, 6.

Extending forwardly from the posts, 2, is a supporting brace, 10, in this instance, formed from a piece of strap-iron, bent into yoke-shape, and its ends secured to the said posts, 2, respectively, by rivets, 11, Figs. 1 and 2. Carried at the under side of the free end of this support, 10, is secured a plate or disk, 12. This plate or disk, 12, is, in this instance, secured to said support, 10, by means of an up-turned peripheral flange, 13, riveted by rivets 14, to the said support, 10, as shown in Figs. 1 and 2.

The plate or disk, 12, is provided with a series of holes, 15, in line with the path of movement of the punches, 7; which holes are large enough to permit the passage of said punches therethrough, as the arm, 4, is rotated on its pivot, 3.

The lower, free ends of the cylindrical punches, 7, are of the form shown in Figs. 1, 3, and 4: that is, one side, $7^a$, of the punch end, is straight, and the other side is beveled off plane, at $7^b$, to meet said straight side, forming a point of the shape shown in Figs. 3 and 4.

16 is a board of wood, or other relatively soft material, of a thickness equal to the distance between the pointed ends of the punches, 7, and the top of the base, 1, for a purpose hereinafter explained.

A spring, 17, coiled upon the shaft, 3, and having a limb, 18, engaging the under surface of the arm, 4, and limbs 19, engaging the inner sides of the posts, 2, tends, normally, to press upwardly the arm, 4, and to withdraw the punches, 7, through the holes, 15. The arm, 4, being in the upward position, a piece of meat, M, to be made tender, is placed upon the board, 16, and brought beneath the path of the punches, 7. The arm, 4, is then pressed downwardly, and the punches, 7, are thereby caused to penetrate the meat, and, owing to the particular construction of their points, such penetration of the meat causes the tough fibers to be torn apart, while the softer, fleshy portion of the meat is simply pressed aside, and the piece of meat where the punches have penetrated is made quite tender, without loss of blood, which is a great desideratum. When the punches have sufficiently penetrated the meat, the arm, 4, is moved upwardly, and the plate, 12, acts as a stripper, permitting the punches to pass upwardly therethrough, but retaining the meat below the same. By moving the board with the meat upon it, to different positions relative to the punches, the piece of meat, no matter how large, may be made tender, by successive operations of the punch-carrying arm. The advantage of having the board, 16, of a relatively soft material, is, obviously, so that the points of the punches will have a comparatively soft material to contact with, after passage through the meat.

That the punches may not penetrate the board too far, I would usually provide a stop, 20, extending from the posts, 2, and adapted to be engaged by an offset, 21, in the under side of the arm, 4.

In the form of invention shown in Figs. 5 and 6, the construction is as follows;—Secured at the lower end of a hollow handle, 22, is a plate, 23, corresponding with plate 6, and having the punches, 24, corresponding with the punches 7, depending therefrom. The handle, 22, is provided with a chamber, 25, within which extends the upper end of a rod, 26; said rod, 26, having, at its upper end, a head, 27, upon which presses the lower end of a helical spring, 28, whose upper end bears against the upper wall of the chamber, 25. The head, 27, of the rod, 26, when in its lowermost position, comes against the upper surface of the plate, 23, (or rather against the upper surface of the superimposed plate, 29, corresponding with the plate 9), thereby preventing the said head from passing out of the lower end of the chamber, 25. To the lower or free end of the rod, 26, is secured a plate or disk, 30, corresponding with the plate or disk, 12, and which plate or disk, 30, is provided with holes, 31, for the passage of the punches, 24. As a convenient means for securing the plate, 30, to the rod, 26, I make the lower end of the said rod screw-threaded, and I provide a hole, 32, leading into the upper end of the chamber, 25, for the insertion of a screw-driver, which, engaging the slot in the head, 27, screws the said rod, 26, into the plate, 30, which, in this instance, to give a better hold for the screw, is reinforced by a plate, 33.

The manner of use of this form of the invention is as follows:—A piece of meat being placed upon a board or other support, the user grasps the handle, 22, and forces the punches, 24, through the meat, at which time the plate, 30, will rest upon the upper surface of the meat, and, by reason of the spring, 28, will permit the necessary relative movement of the punches, 24. When the handle, 22, is released, the stress of the spring 28, pressing against the head, 27, will cause the plate, 30, to remain in engagement with the meat, while the handle, 22, plate, 23, and punches, 24, carried thereby, will move upwardly, and the meat be stripped from the punches by the plate, 30.

Having thus described my invention, I claim as new, and desire to secure by Letters Patent:—

In a device of the character recited, the combination with a base having an upwardly extending support, of a yoke connected to said support and extending forwardly therefrom, said yoke being supported relatively to the base to provide an unobstructed space between the latter and the yoke, a stripping plate arranged upon the free end of said yoke and having an upwardly extending flange embracing said yoke, said stripping plate being also provided with a series of perforations, means for fastening said flange to said yoke to hold the stripping plate upon the latter, an arm pivotally connected to said support and arranged within said yoke, a plate carried by said arm, a series of depending punches carried by said plate and adapted to pass through the perforations of said stripping plate, a spring for normally maintaining said punches withdrawn from said perforations, and a stop extending transversely of said support to be engaged by said arm for limiting the downward movement of the latter, substantially as set forth.

In testimony whereof, I have hereunto affixed my signature.

FRANK C. JAMISON.

Witnesses:
WALTER C. PUSEY,
J. HOWARD REBER.